United States Patent
Shim et al.

(10) Patent No.: US 10,924,262 B2
(45) Date of Patent: Feb. 16, 2021

(54) METHOD FOR PROCESSING DYNAMIC DATA BY FULLY HOMOMORPHIC ENCRYPTION METHOD

(71) Applicant: Crypto Lab Inc., Seoul (KR)

(72) Inventors: Hyungbo Shim, Seoul (KR); Junghee Cheon, Seoul (KR); Yongsoo Song, Seoul (KR); Miran Kim, Seoul (KR); Junsoo Kim, Seoul (KR); Chanhwa Lee, Seoul (KR)

(73) Assignee: Crypto Lab Inc., Seoul (KR)

( * ) Notice: Subject to any disclaimer, the term of this patent is extended or adjusted under 35 U.S.C. 154(b) by 0 days.

(21) Appl. No.: 16/534,665

(22) Filed: Aug. 7, 2019

(65) Prior Publication Data
US 2019/0363872 A1 Nov. 28, 2019

Related U.S. Application Data

(63) Continuation of application No. PCT/KR2017/002479, filed on Mar. 8, 2017.

(30) Foreign Application Priority Data

Feb. 8, 2017 (KR) .................. 10-2017-0017660

(51) Int. Cl.
*H04L 9/00* (2006.01)
*G06F 9/4401* (2018.01)
*H04L 9/06* (2006.01)

(52) U.S. Cl.
CPC ............ *H04L 9/008* (2013.01); *G06F 9/4401* (2013.01); *H04L 9/0618* (2013.01)

(58) Field of Classification Search
CPC ....................................................... H04L 9/008
(Continued)

(56) References Cited

U.S. PATENT DOCUMENTS 8,837,715 B2 9/2014 Troncoso Pastoriza et al.
9,083,526 B2 7/2015 Gentry
(Continued)

FOREIGN PATENT DOCUMENTS

EP 2677680 A1 12/2013
KR 10-1475747 B1 12/2014
(Continued)

OTHER PUBLICATIONS

Gentry, C., "A Fully Homomorphic Encryption Scheme", Dissertation Submitted to the Dept. of Computer Sci., Sep. 2009, 209 pages.
(Continued)

*Primary Examiner* — Christopher J Brown
(74) *Attorney, Agent, or Firm* — Nelson Mullins Riley & Scarborough LLP; Kongsik Kim, Esq.

(57) ABSTRACT

The present disclosure provides a computer-implemented method for processing dynamic data by dynamic data processing device. The device comprises a homomorphic encryption module and a plurality of computing modules running in parallel. The method comprises carrying out, by the homomorphic encryption module, fully homomorphic encryption to dynamic data received from an object which generates the dynamic data; updating, by the computing module which is not in bootstrapping, the encrypted state variable; and carrying out, by the computing module which completes bootstrapping, the first update to the encrypted state variable. The first update to the encrypted state variable after completion of bootstrapping is carried out by $\bar{x}(t+N_{boot}) \rightarrow A^{N_{boot}}\bar{x}(t) + \sum_{j=0}^{N_{boot}-1} A^{N_{boot}-1-j} B(\bar{r}(t+j) - \bar{y}(t+j))$.

6 Claims, 5 Drawing Sheets

(58) Field of Classification Search
USPC .......................................................... 713/189
See application file for complete search history.

(56) References Cited

U.S. PATENT DOCUMENTS

| | | |
|---|---|---|
| 9,716,590 B2 * | 7/2017 | Gentry .................... H04L 9/008 |
| 2012/0213359 A1 | 8/2012 | Troncoso Pastoriza et al. |
| 2013/0170640 A1 | 7/2013 | Gentry |
| 2015/0358153 A1 | 12/2015 | Gentry |

FOREIGN PATENT DOCUMENTS

| | | |
|---|---|---|
| WO | 2012/149395 A1 | 11/2012 |
| WO | 2013/189783 A1 | 12/2013 |
| WO | 2016/141860 A1 | 9/2016 |

OTHER PUBLICATIONS

Gentry, C. et al., "Better Bootstrapping in Fully Homomorphic Encryption", Dec. 15, 2001, 22 pages.
Sundaram, S. et al., "Distributed Function Calculation via Linear Iterative Strategies in the Presence of Malicious Agents", IEEE Transactions on Automatic Control, Jul. 2011, 15 pages.
Kim, J. et al., "Encrypting Controller using Fully Homomorphic Encryption for Security of Cyber-Physical Systems", ScienceDirect, IFAC-PapersOnLine 49-22 (2016) 175-180.

* cited by examiner

METHOD FOR PROCESSING DYNAMIC DATA BY FULLY HOMOMORPHIC ENCRYPTION METHOD

CROSS-REFERENCE TO RELATED APPLICATION

This application is a continuation application of International Application No. PCT/KR2017/002479 filed on Mar. 8, 2017, which claims priority to Korean Application No. 10-2017-0017660 filed on Feb. 8, 2017. The applications are expressly incorporated herein by reference.

TECHNICAL FIELD

The present disclosure relates to a method for processing dynamic data, more particularly to a method which can easily update state variables after bootstrapping that is carried out in processing fully homomorphically-encrypted dynamic data and can expand the lifespan of the encrypted dynamic data.

BACKGROUND

As physical systems are connected to computers through network communications, real control system can be a target of cyber attackers. Such an integration of computation (cyber part), physical system (physical part), and communication (link between cyber and physical parts), is called cyber-physical systems (CPSs).

By its openness and connectivity nature, CPS is vulnerable to malicious attacks. Failure or malfunction on the critical infrastructure such as power plants caused by cyber-physical attacks leads to a tremendous catastrophe.

It can be considered to encrypt control signal in order to defend the cyber-physical system from the cyber-physical attacks. In conventional encryption, the controller has to decrypt the received control signal for computing the control signal.

The secret key for decryption should be kept inside the controller, which has possible risk to be stolen by attackers. Thus, the security is still threatened in the encryption of the control signal.

EP 2 677 680 A1 published on Dec. 25, 2013 discloses a technique that homomorphic encryption (hereinafter referred to as "HE") is carried out to control signal. However, noise increases as the number of computations of the signal of HE increases.

SUMMARY

The object of the present disclosure is to provide a method to solve the problem which is accompanied with bootstrapping and expand the lifespan of data which is encrypted by fully homomorphic encryption.

The present disclosure provides a computer-implemented method for processing dynamic data by dynamic data processing device. The device comprises a homomorphic encryption module and a plurality of computing modules running in parallel. The method comprises carrying out, by the homomorphic encryption module, fully homomorphic encryption to dynamic data received from an object which generates the dynamic data; updating, by the computing module which is not in bootstrapping, the encrypted state variable; and carrying out, by the computing module which completes bootstrapping, the first update to the encrypted state variable. The first update to the encrypted state variable after completion of bootstrapping is carried out by $\bar{x}(t+N_{boot}) \rightarrow A^{N_{boot}} \bar{x}(t) + \Sigma_{j=0}^{N_{boot}-1} A^{N_{boot}-1-j} B(\bar{r}(t+j) - \bar{y}(t+j))$.

Updating by the computing module which is not in bootstrapping can comprise computing an encrypted catch-up vector recursively and updating the encrypted state variable. The computation of the encrypted catch-up vector can be carried out by $\bar{P}_i(z_0, \ldots, z_{i-1}) := \Sigma_{j=0}^{i-1} A^{i-j-1} \bar{z}_j$ where $z_j \leftarrow B(\bar{r}(t+j) - \bar{y}(t+j))$; $0 \leq j \leq i$. The update of the encrypted state variable can be carried out by $\bar{x}(t+i) = A^i \bar{x}(t) + \bar{P}_i(z_0, \ldots, z_{i-1})$.

The bootstrapping can be carried out to the ciphertext having level which is lower than the level of the encrypted state variable $\bar{x}(t)$ by 1.

The method of the present disclosure can further comprise starting to operate $(i+1)^{th}$ computing module in the middle of duration which $i^{th}$ ($1 \leq i \leq n$) computing module operates; terminating transient response of the $(i+1)^{th}$ computing module before the $i^{th}$ computing module stops to operate; starting to operate the first computing module in the middle of duration which $n^{th}$ computing module operates; and terminating transient response of the first computing module before the $n^{th}$ computing module stops to operate.

Figure 1:
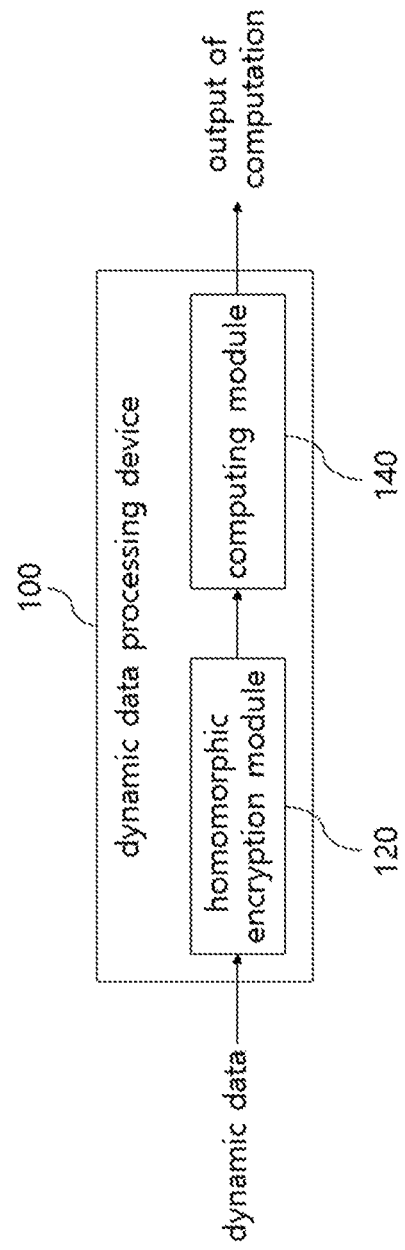
FIG. 1 is a block diagram showing the flow of processing dynamic data according to the present disclosure.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The method according to the present disclosure can be carried out by an electronic arithmetic device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 5:
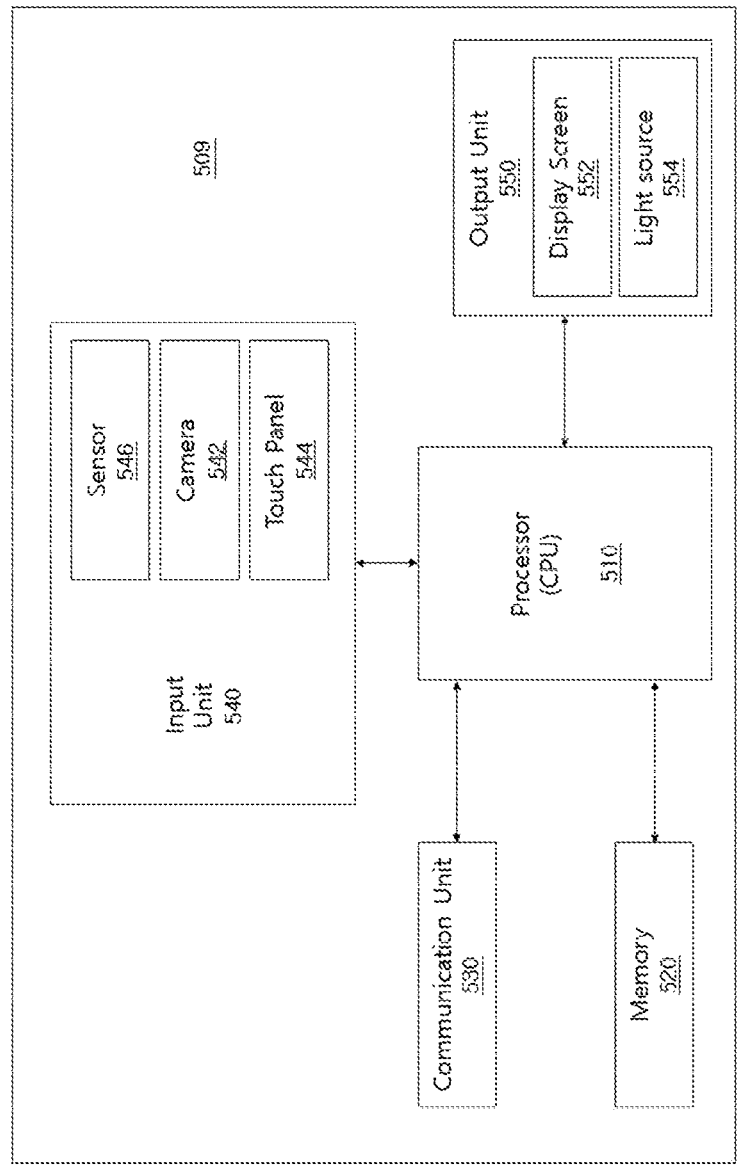
FIG. 5 is one embodiment of an example diagrammatic view of a device architecture.

A variety of devices can be used herein. FIG. 5 illustrates an example diagrammatic view of an exemplary device architecture according to embodiments of the present disclosure. As shown in FIG. 5, a device 509 may contain multiple components, including, but not limited to, a processor (e.g., central processing unit (CPU) 510, a memory 520, a wired or wireless communication unit 130, one or more input units 540, and one or more output units 550. It should be noted that the architecture depicted in FIG. 5 is simplified and provided merely for demonstration purposes.

The architecture of the device 509 can be modified in any suitable manner as would be understood by a person having ordinary skill in the art, in accordance with the present claims. Moreover, the components of the device 509 themselves may be modified in any suitable manner as would be understood by a person having ordinary skill in the art, in accordance with the present claims. Therefore, the device architecture depicted in FIG. 5 should be treated as exemplary only and should not be treated as limiting the scope of the present disclosure.

The processor 510 is capable of controlling operation of the device 509. More specifically, the processor 510 may be operable to control and interact with multiple components installed in the device 509, as shown in FIG. 5. For instance, the memory 520 can store program instructions that are executable by the processor 510 and data. The process described herein may be stored in the form of program instructions in the memory 520 for execution by the processor 510. The communication unit 530 can allow the device 509 to transmit data to and receive data from one or more external devices via a communication network. The input unit 540 can enable the device 509 to receive input of various types, such as audio/visual input, user input, data input, and the like. To this end, the input unit 540 may be composed of multiple input devices for accepting input of various types, including, for instance, one or more cameras 542 (i.e., an "image acquisition unit"), touch panel 544, microphone (not shown), sensors 546, keyboards, mice, one or more buttons or switches (not shown), and so forth. The term "image acquisition unit," as used herein, may refer to the camera 542, but is not limited thereto. The input devices included in the input 540 may be manipulated by a user. The output unit 550 can display information on the display screen 552 for a user to view. The display screen 552 can also be configured to accept one or more inputs, such as a user tapping or pressing the screen 552, through a variety of mechanisms known in the art. The output unit 550 may further include a light source 554. The device 509 is illustrated as a single component, but the device may also be composed of multiple, separate components that are connected together and interact with each other during use.

The device 509 can thus be programmed in a manner allowing it to generate various exemplary files having column-oriented layouts, and more specifically, to generate various exemplary files having column-oriented layouts that improve data security and query speed by selective encryption to the columns.

In this specification, "dynamic data" is defined as data which has no value or significantly reduced value if it is not processed within a certain period of time. Control data, streaming data and the like are examples of dynamic data.

FIG. 1 shows a flow of processing dynamic data according to the present disclosure.

Dynamic data generated by an object is inputted to a dynamic data processing device 100 of the present disclosure, and then is encrypted at a homomorphic encryption module 120 by using fully homomorphic encryption (hereinafter referred to as "FHE"). The dynamic data can be streaming data or a data (signal) which is generated at a device to be controlled 20.

The dynamic data encrypted by FHE is transmitted to a computing module 140 and then is computed there. The dynamic data encrypted by FHE does not have to be decrypted for computation. The computation is carried out to the dynamic data encrypted by FHE and then the result of the computation is outputted or is transmitted to the following step.

FHE which is applied to processing of dynamic data according to the present disclosure will be described hereinafter.

In this specification, all logarithms are base 2 unless otherwise indicated. Notations are defined as follows:
⟨.,.⟩: inner product of two vectors
⌊r⌉: the nearest integer to r $$\mathbb{Z} \cap \left[-\frac{q}{2}, \frac{q}{2}\right]:$$

a representative of $\mathbb{Z}_q$
x←D: uniform sampling x according to distribution D
U(S): uniform distribution on set S
$D_\sigma$: discrete Gaussian distribution of parameter σ
λ: security parameter Suppose that positive integers n and q≥2 are given. For s∈$\mathbb{Z}_q^n$ and a distribution χ over $\mathbb{Z}$, we define $A_{q,\chi}^{LWE}$(s) as the distribution obtained by sampling a←U($\mathbb{Z}_q^n$) and e←χ, and returning c=(b,a)∈$\mathbb{Z}_q^{n+1}$ where b=⟨a,s⟩+e.

Let D be a distribution on $\mathbb{Z}_q^n$. The learning with errors problem, denoted by $LWE_{n,q,\chi}$(D), is to distinguish arbitrarily many independent samples chosen according to $A_{q,\chi}^{LWE}$(s) for a fixed s←D, from U($\mathbb{Z}_q^{n+1}$)

FHE scheme will be unlimitedly and exemplarily described based on the above definition.

Take a modulus p and base modulus $q_0$ based on the predetermined security parameter λ.

Let $q_l = q_0 \cdot p^l$ for l=1, . . . , L.

The parameter n and α are appropriately chosen based on λ and $q_L$ for $LWE_{n,q_L,D_\sigma}$($D_\sigma$) problem that achieves at least $2^\lambda$ security for σ=α$q_L$. The parameters params=(p, $q_L$, n, σ) is outputted.

The secret key is set by sampling as follows:

$$sk \leftarrow D_\sigma^n$$

A message (m∈$\mathbb{Z}_{q_0}^l$) can be encrypted by FHE as follows:
Sample a←U($\mathbb{Z}_{q_L}^{l \times n}$)) and e←$D_\sigma^l$, and then
Enc (m, sk): c=(b,a)∈$\mathbb{Z}_{q_L}^{l \times (n+1)}$; b=−a·sk+m+e (mod $q_L$)
The level of this ciphertext is "L."
The decryption to the ciphertext can be carried out as follows:
Dec(c, sk): m=b+a·sk mod $q_l$ The level of the ciphertext of FHE starts at "L." However, the level is lowered by one when multiplication of ciphertext is carried out. When the level becomes "0," the multiplication of ciphertext of FHE cannot be carried out. At that time, bootstrapping (also referred to as "rebooting") should be carried out for further computation of the ciphertext.

Figure 2:
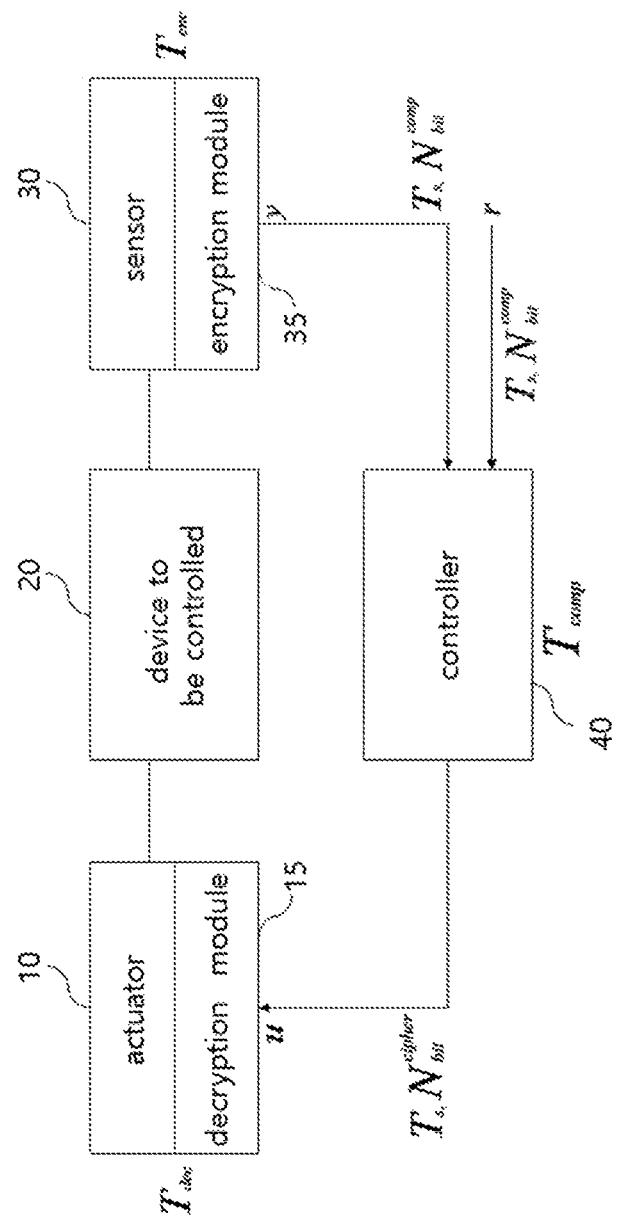
FIG. 2 is a block diagram of control system where the process of dynamic data is carried out according to the present disclosure.

FIG. 2 shows a system with the dynamic data processing device according to the present disclosure.

The system comprises an actuator 10 for carrying out control according to control commands, a device 20 which is controlled by the actuator 10, a sensor 30 sensing the output from the device 20, and a controller 40 for generating control commands. The controller 40 acts as the computing module 140 in FIG. 1.

In this specification, it is assumed that the controller 40 is a discrete-time linear time-invariant controller for easy description. However, it should be understood that a person skilled in the art who understands the present disclosure can apply the present disclosure to the other types of controller without special difficulties.

The actuator 10 can comprise a decryption module 15. The sensor 30 can comprise an encryption module 35. The decryption module 15 can be integral with the actuator 10 or can be provided as being separate from the actuator 10. The encryption module 35 can be integral with the sensor 30 or can be provided as being separate from the sensor 30.

The state-space representation of the controller 40 can be defined as follows:

$$x(t+1)=Ax(t)+B(r(t)-y(t))$$

$$u(t)=Cx(t)+D(r(t)-y(t)) \quad \text{[Mathematical Equation 1]}$$

x(t)∈$\mathbb{R}^l$: state variable of the controller 40
y(t)∈$\mathbb{R}^p$: output to the device 20 (or input to the controller 40)
u(t)∈$\mathbb{R}^m$: input to the device 20 (or output from the controller 40)
r(t)∈$\mathbb{R}^p$: reference command The dimension of the parameter matrix and gain matrix is as follows:

$$A \in \mathbb{R}^{l \times l}; B \in \mathbb{R}^{l \times p}; C \in \mathbb{R}^{m \times l}; D \in \mathbb{R}^{m \times p}$$

Suppose that all signals are bounded by some constant M>0. Then, the signals are scaled by $q_0$/(2M) and are rounded before encryption such that each component of x(t), y(t), u(t), r(t) is represented as an element of the message space $\mathbb{Z}_{q_0} = \mathbb{Z} \cap [-q_0/2, q_0/2)$.

It is assumed that the gain matrices A, B, C and D are stored in plaintext. However, the gain matrices can be stored in ciphertext.

The encrypted signals processed by the controller 40 has the dimension as follows:

$$\bar{x}(t) \in \mathbb{Z}_q^{l \times (n+1)}; \bar{y}(t) \in \mathbb{Z}_q^{p \times (n+1)}; \bar{u}(t) \in \mathbb{Z}_q^{m \times (n+1)}; \bar{r}(t) \in \mathbb{Z}_q^{p \times (n+1)}$$

The bar above the state variables indicates that the state variables are encrypted by FHE. However, the mathematical equations for the encrypted state variables can also be applied to the state variables in plaintext according to the characteristic of FHE.

The encrypted signals to be inputted to the controller 40 can be computed as follows:

$$\bar{r}(t) = Enc\left(\left\lfloor \frac{q_0}{2M} \cdot r(t) \right\rceil, sk\right)$$

$$\bar{y}(t) = Enc\left(\left\lfloor \frac{q_0}{2M} \cdot y(t) \right\rceil, sk\right)$$

The actuator 10 decrypts the output from the controller 40 as follows:

$$u(t) = \frac{2M}{q_0} \cdot Dec(\bar{u}(t), sk)$$

Thus, the controller dynamics actually run in the ciphertext space as follows:

$$\bar{x}(t+1) \leftarrow \bar{A}\bar{x}(t) + \bar{B}(\bar{r}(t) - \bar{y}(t))$$

$$\bar{u}(t) \leftarrow \bar{C}\bar{x}(t) + \bar{D}(\bar{r}(t) - \bar{y}(t)) \quad \text{[Mathematical Equation 2]}$$

The terms in FIG. 2 are defined as follows:
$T_{dec}$: time that is consumed for decryption in the actuator
$T_{enc}$: time that is consumed for encryption in the sensor
$T_s$: sampling time
$N_{bit}^{comp}$: number of bits that is required to represent one (compressed ciphertext) element of the signal $\bar{y}$(t) and $\bar{r}$(t)

$N_{bit}^{cipher}$: number of bits that is required to represent one (uncompressed ciphertext) element of the signal $\bar{x}(t)$, $\bar{u}(t)$, $\bar{y}(t)$ and $\bar{r}(t)$.

$T_{comp}$: time that is consumed to complete all operations in Mathematical Equation 2

The following design specifications can be considered further to the above:

log p : number of bits of p ; p is modulus that is used for FHE $I_{capa}$: total network throughput or channel capacity of the communication in bps $T_{mult}^{A,x}$ or $T_{mult}$: time that is consumed for all element-wise multiplications occurred between the matrix A and the ciphertext $\bar{x}$.

Figure 3:
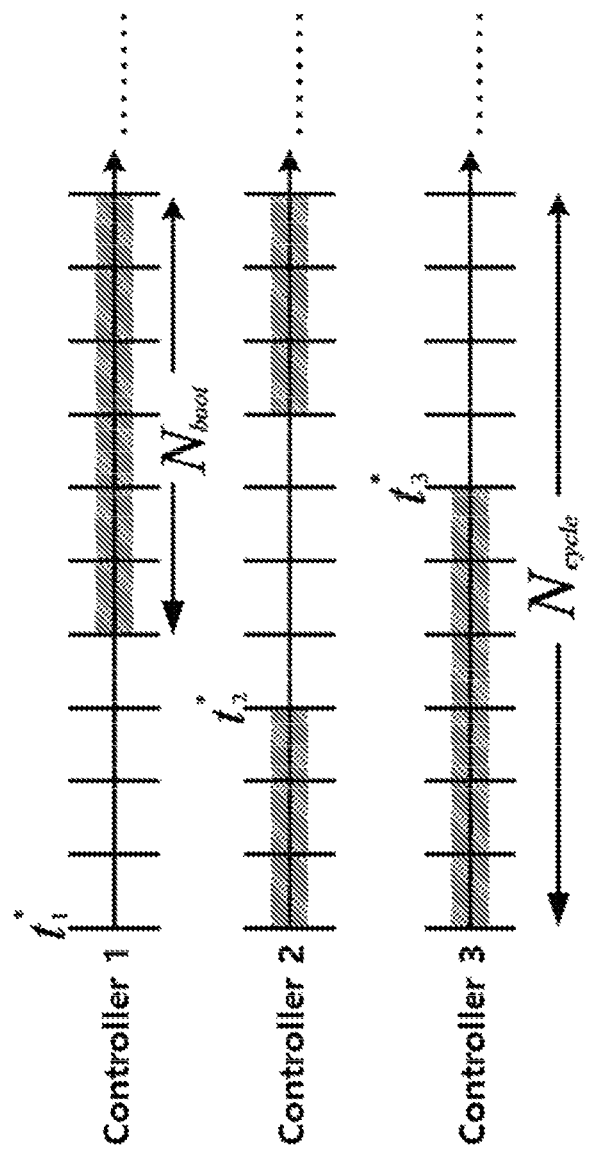
FIG. 3 is a drawing for explaining the method for solving the problem caused by boot strapping.

As illustrated in FIG. 3, a plurality of controllers can be used for processing dynamic data according to the present disclosure.

The number of controllers can be varied according to design requirements. In FIG. 3, the wide area indicates bootstrapping.

The terms for describing bootstrapping are defined as follows:

$N_{boot}$: number of samples (measured by $T_s$) that is required for performing bootstrapping the state $\bar{x}$ $N_{lifespan}$: number of samples (measured by $T_s$) that takes for a fresh $\bar{x}$ to consume its lifespan by computing Mathematical Equation 2

$$N_{cycle} = N_{boot} + N_{lifespan}$$

Generally, the state variable cannot be updated while the bootstrapping is carried out in a controller. However, according to the present disclosure, while the bootstrapping is carried out in a controller, the state variables of the other controllers can be updated because the multiple controllers run in parallel. According to the present disclosure, the state variable of the controller which completes bootstrapping can be updated as follows:

$$\bar{x}(t+N_{boot}) \rightarrow A^{Nboot}\bar{x}(t) + \Sigma_{j=0}^{Nboot-1} A^{Nboot-1-j} B(\bar{r}(t+j) - \bar{y}(t+j))$$ [Mathematical Equation 3]

The controller which completes bootstrapping can easily update the ciphertext of the state variable to that of the present time according to Mathematical Equation 3.

We can choose sufficiently large number $N_c$ of the controllers and the set of $\{t_i^*: 0 \le t_i^* \le N_{cycle}, 1 \le i \le N_c\}$ like in FIG. 3, where $t_i^*$ is the time instant (modulo $N_{cycle}$) for the bootstrapping of the i-th controller to be completed, such that one can find at least one controller not in bootstrapping status at each time t.

Figure 4:
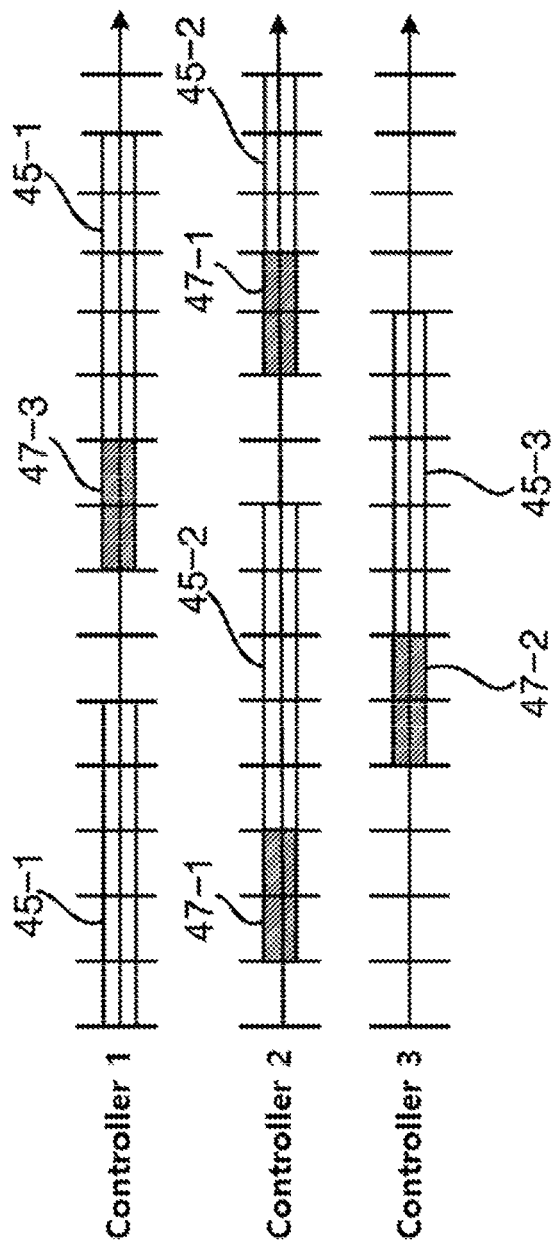
FIG. 4 is a drawing for explaining the update of state variable according to another aspect of the present disclosure.

FIG. 4 shows a drawing for explaining the update of state variable according to another aspect of the present disclosure.

A plurality of the controllers run in parallel as in FIG. 3. Controller 2 starts to operate in the middle of duration (45-1) which Controller 1 operates. The transient response of Controller 2 persists during the time (47-1), and thus the transient response of Controller 2 is terminated before Controller 1 stops to operate such that Controller 2 can normally follow control signal. Controller 3 starts to operate in the middle of duration (45-2) which Controller 2 operates. The transient response of Controller 3 persists during the time (47-2), and thus the transient response of Controller 3 is terminated before Controller 2 stops to operate such that Controller 3 can normally follow control signal. Controller 1 starts to operate in the middle of duration (45-3) which Controller 3 operates. The transient response of Controller 1 persists during the time (47-3), and thus the transient response of Controller 1 is terminated before Controller 3 stops to operate such that Controller 1 can normally follow control signal. The above-mentioned processes are repeated.

The operation time (45-1, 45-2, 45-3) can be shorter than the lifespan of the state variables.

According to the present disclosure, $(i+1)^{th}$ controller starts to operate in the middle of duration which $i^{th}$ controller operates, and then the $i^{th}$ controller stops to operate. Further, the transient response of $(i+1)^{th}$ controller is terminated before the $i^{th}$ controller stops to operate. Thus, the $(i+1)^{th}$ controller can normally follow the control signal continuously. Consequently, bootstrapping is not required according to the embodiments of the present disclosure shown in FIG. 4.

The method for increasing the lifespan of the ciphertext of FHE in the process of dynamic data will be described. The lifespan of the ciphertext of FHE decreases in proportion to the number of multiplications as the matrix A is multiplied i times to the ciphertext according to Mathematical Equation 1. If the state variables are updated during $N_{lifespan}$, the required number of levels during bootstrapping is large. This means that the lifespan of the ciphertext is significantly reduced.

The present disclosure suggests the following methods for expanding the lifespan of the ciphertext. In the following aspects of the present disclosure, the state variables without upper bar are used in the description. However, it should be understood that the description is also applied to the encrypted state variables in view of the characteristic of FHE.

For an (l×l) matrix A and l-dimensional vectors $z_0, \ldots, z_{i-1}$, let $$P_i(z_0, \ldots, z_{i-1}) := \Sigma_{j=0}^{i-1} A^{i-j-1} z_j$$ [Mathematical Equation 4].

And then, it can be easily proved that the following equation is true.

$$P_{i+j}(z_0, \ldots, z_{i+j-1}) = A^j \cdot P_i(z_0, \ldots, z_{i-1}) + P_j(z_0, \ldots, z_{i+j-1})$$ [Mathematical Equation 5]

If one takes $z_j \leftarrow B(r(t+j) - y(t+j))$; $0 \le j \le I$, then $x(t+i) = A^i x(t) + P_i(z_0, \ldots, z_{i-})$.

Therefore, the state variable x(t) can be updated to x(t+i) directly using the "catch-up" vector $P_i(z_0, \ldots, z_{i-1})$. Using the catch-up vector, the number of multiplications of matrix can be reduced. Thus, the lifespan of the ciphertext can expand.

The values such as $A, A^2, A^3, \ldots, A^n$, the catch-up vector and/or $z_i$ can be stored in memory.

The following relationship can be satisfied because $z_j \leftarrow B(r(t+j) - y(t+j))$; $0 \le j \le i$;

$$P(t,i) = \Sigma_{j=0}^{i-1} A^{i-j-1} B(r(t+j) - y(t+j))$$

Thus, the state equation can be expressed as follows:

$$x(t+j) = A^i x(t) + P(t,i)$$ [Mathematical Equation 6]

Then, the following relationship is satisfied:

$$P(t, i+j) = A^j P(t,i) + P(t+i, j)$$

The catch-up vectors P(t,i) are computed and are outputted for each time between 1 and $2^h$. If h is "2," the catch-up vectors are computed as follows:

<First Step Computation>
If i is "1," P(t, 1) = B(r(0) − y(0))
<Second Step Computation>
If i is "2," P(t, 2) = AP(t, 1) + P(t+1, 1)
<Third Step Computation>
If i is "3," P(t, 3) = AP(t, 2) + P(t+2, 1)

<Fourth Step Computation>

If i is "4," $P(t, 4)=A^2P(t, 2)+P(t+2, 2)$

Each computation can be easily and fast carried out because the values of $A^n$ are stored in memory.

The second step computation can be carried out using the result of the first step computation. That is, the multiplication can be recursively carried out by <h−1> times without being carried out by $2^h$ times. Consequently, the decreasing speed of the level of the ciphertext is reduced.

On the other hand, the number of recursive computations is limited because the level of $x(t+2^h)$ is lower than that of $x(t)$ by h.

In order to solve the problem, the present disclosure suggests the following method.

For easy description, it is assumed that $N_{lifespan}$ is $2^{L-1}$ and that the level of x(t) is "2."

For computation of $P(0, 1), P(0, 2), \ldots, P(0, N_{lifespan})$ during the time of $2^{L-1}$, the levels of L−1 are consumed in maximum. That is, the level after the computation can be "1" in minimum. Consequently, the level of state variable x(t+i) which is computed according to Mathematical Equation 6 during i=1, 2, ..., $N_{lifespan}$ becomes "1" in minimum.

And then, rebooting is carried out to the state variable $x(t+N_{lifespan})$ having level of 1.

The catch-up vector for carrying out time-warp to $x(t+N_{lifespan}+N_{boot})$ from $x(t+N_{lifespan})$ is computed during the rebooting. Because the level of the state variable $x(t+N_{lifespan})$ which completes rebooting is "3," the level of the state variable which is updated according to Mathematical Equation 3 is reduced to "2." The reduced level of "2" is the same as that of the state variable. Consequently, the computation of control signal can be unlimitedly carried out.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

The invention claimed is:

1. A computer-implemented method for processing dynamic data by dynamic data processing device, the device comprising a homomorphic encryption module and a plurality of computing modules running in parallel, the method comprising:

carrying out, by the homomorphic encryption module, fully homomorphic encryption to dynamic data received from an object which generates the dynamic data;

updating, by a computing module which is not in a bootstrapping mode, an encrypted state variable; and carrying out, by a computing module which completes bootstrapping, a first update to the encrypted state variable;

wherein the first update to the encrypted state variable after completion of the bootstrapping is carried out by $$\bar{x}(t+N_{boot}) \rightarrow A^{Nboot}\bar{x}(t) + \Sigma_{j=0}^{Nboot-1} A^{Nboot-1-j} B(\bar{r}(t+j)-\bar{y}(t+j)).$$

2. The method according to claim 1, wherein updating by the computing module which is not in the bootstrapping mode comprises computing an encrypted catch-up vector recursively, and updating the encrypted state variable; and wherein the computation of the encrypted catch-up vector is carried out by $\bar{P}_i(z_0, \ldots, z_{i-1}) := \Sigma_{j=0}^{i-1} A^{i-j-1} \bar{z}_j$ where $z_j \leftarrow B(r(t+j)-y(t+j))$; $0 \leq j \leq i$ and the update of the encrypted state variable is carried out by $\bar{x}(t+i) = A^i \bar{x}(t) + \bar{P}_i(z_0, \ldots, z_{i-1})$.

3. The method according to claim 1, wherein the bootstrapping is carried out to the ciphertext having level which is lower than the level of the encrypted state variable $\bar{x}(t)$ by 1.

4. The method according to claim 1, further comprising:

starting to operate $(i+1)^{th}$ computing module in the middle of duration which $i^{th}$ ($1 \leq i \leq n$) computing module operates;

terminating transient response of the $(i+1)^{th}$ computing module before the $i^{th}$ computing module stops to operate;

starting to operate the first computing module in the middle of duration which $n^{th}$ computing module operates; and terminating transient response of the first computing module before the $n^{th}$ computing module stops to operate.

5. The method according to claim 2, wherein the bootstrapping is carried out to the ciphertext having level which is lower than the level of the encrypted state variable $\bar{x}(t)$ by 1.

6. The method according to claim 2, further comprising:

starting to operate $(i+1)^{th}$ computing module in the middle of duration which $i^{th}$ ($1 \leq i \leq n$) computing module operates;

terminating transient response of the $(i+1)^{th}$ computing module before the $i^{th}$ computing module stops to operate;

starting to operate the first computing module in the middle of duration which $n^{th}$ computing module operates; and terminating transient response of the first computing module before the $n^{th}$ computing module stops to operate.

* * * * *